United States Patent
Foreman et al.

(10) Patent No.: US 10,393,532 B2
(45) Date of Patent: Aug. 27, 2019

(54) EMERGENCY RESPONSIVE NAVIGATION

(71) Applicant: International Business Machines Corporation, Armonk, NY (US)

(72) Inventors: Eric A. Foreman, Fairfax, VT (US); Sudeep Mandal, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 267 days.

(21) Appl. No.: 14/887,369

(22) Filed: Oct. 20, 2015

(65) Prior Publication Data
US 2017/0108342 A1 Apr. 20, 2017

(51) Int. Cl.
G01C 21/34 (2006.01)
G01C 21/36 (2006.01)

(52) U.S. Cl.
CPC ..... *G01C 21/3415* (2013.01); *G01C 21/3691* (2013.01)

(58) Field of Classification Search
CPC ............... G08B 25/006; G01C 21/343; G01C 21/3407; G01C 21/3415
See application file for complete search history.

(56) References Cited

U.S. PATENT DOCUMENTS

| | | | |
|---|---|---|---|
| 5,014,052 A | 5/1991 | Obeck | |
| 7,119,669 B2 | 10/2006 | Lundsgaard et al. | |
| 8,442,482 B2 | 5/2013 | Maier et al. | |
| 8,793,036 B2 | 7/2014 | Koon et al. | |
| 8,838,321 B1 | 9/2014 | Ferguson | |
| 8,948,955 B2 | 2/2015 | Zhu et al. | |
| 8,965,677 B2 | 2/2015 | Breed et al. | |
| 9,613,531 B2* | 4/2017 | Alam | H04W 4/029 |
| 2004/0139044 A1* | 7/2004 | Rehwald | G06F 19/322 |

(Continued)

FOREIGN PATENT DOCUMENTS

WO 2010111442 A1 9/2010

OTHER PUBLICATIONS

Bierbower, Chris, "Internet of Things for Cities", 6 pages, printed Sep. 3, 2015, <http://chrisbierbower.com/emergency-vehicle-navigation/>.

(Continued)

*Primary Examiner* — Kimberly S Berona
*Assistant Examiner* — Michael F Whalen
(74) *Attorney, Agent, or Firm* — Christopher K. McLane; Daniel R. Simek (57) ABSTRACT

In an approach for determining navigation routes, a computer identifies an emergency situation and a corresponding location. The computer identifies an emergency service based on the identified emergency situation and the corresponding location. The computer identifies an emergency treatment provider based on the identified emergency situation and the corresponding location. The computer determines a navigation route based on respective locations of the identified emergency situation, the identified emergency service, and the identified emergency treatment provider. The computer identifies one or more incoming devices on the determined navigation route. The computer determines an alternate navigation route for the identified one or more incoming devices, wherein the determined alternate navigation route reduces travel on the determined navigation route.

20 Claims, 3 Drawing Sheets

(56) References Cited

U.S. PATENT DOCUMENTS

| | | | |
|---|---|---|---|
| 2008/0161986 A1 | 7/2008 | Breed | |
| 2009/0099732 A1* | 4/2009 | Pisz | G01C 21/20 701/45 |
| 2010/0117869 A1 | 5/2010 | Rieth et al. | |
| 2010/0250111 A1 | 9/2010 | Gutierrez et al. | |
| 2012/0253661 A1* | 10/2012 | Tuukkanen | G01C 21/3492 701/423 |
| 2013/0069802 A1 | 3/2013 | Foghel et al. | |
| 2013/0231824 A1 | 9/2013 | Wilson et al. | |
| 2013/0338868 A1 | 12/2013 | Essame et al. | |
| 2014/0372015 A1* | 12/2014 | Namm | H04W 4/046 701/117 |
| 2015/0066557 A1* | 3/2015 | Lichti | H04W 4/028 705/7.15 |
| 2015/0088835 A1* | 3/2015 | Davis | G06F 17/30371 707/690 |
| 2015/0111525 A1* | 4/2015 | Crockett | H04W 4/22 455/404.2 |
| 2016/0071418 A1* | 3/2016 | Oshida | G08G 1/22 701/23 |
| 2016/0140299 A1* | 5/2016 | Al Harbi | G06F 19/327 705/2 |
| 2016/0303969 A1* | 10/2016 | Akula | A61B 5/6893 |
| 2016/0320193 A1* | 11/2016 | Tuukkanen | B60W 30/09 |
| 2017/0030725 A1* | 2/2017 | Gordon | G01C 21/3415 |
| 2017/0109474 A1* | 4/2017 | Jung | G08B 21/02 |
| 2017/0276495 A1* | 9/2017 | Krishnan | G01C 21/3415 |
| 2018/0005523 A1* | 1/2018 | Cahan | G08G 1/087 |
| 2018/0087914 A1* | 3/2018 | Bravo | G01C 21/3415 |
| 2018/0090000 A1* | 3/2018 | Bravo | G08G 1/0965 |

OTHER PUBLICATIONS

"FBI: Google's driverless cars could be lethal weapons", BBC News, Jul. 17, 2014, 1 page.

"Google Self-Driving Car Project Monthly Report", May 2015, 6 pages.

"Automatic signal control to prevent emergency vehicle collisions?", ITS International, First Published in ITS International Jan. Feb. 2012, 3 pages, <http://www.itsinternational.com/sections/nafta/features/automatic-signal-control-to-prevent-emergency-vehicle-collisions>.

"Reroute town's traffic to get emergency vehicles through", New Scientist, Aug. 29, 2013, 5 pages, <http://www.newscientist.com/article/dn24126-reroute-towns-traffic-to-get-emergency-vehicles-through.html?cmpid=RSS%7CNSNS%7C2012-GLOBAL%7Conline-news%20-%20.Uh-rhHDn-Uk%20-%20.UiDL5nDn-Uk#.VNPDDp2Udwt>.

\* cited by examiner

EMERGENCY RESPONSIVE NAVIGATION

BACKGROUND

The present invention relates generally to the field of navigation systems, and more particularly to re-routing traffic around routes traveled by emergency services to an emergency situation and an emergency treatment provider.

Telematics is an interdisciplinary field that encompasses telecommunications, vehicular technologies, road transportation, road safety, electrical engineering (e.g., sensors, instrumentation, wireless communications, etc.), and computer science (e.g., multimedia, Internet, etc.). For example, vehicle telematics encompasses emergency warning systems, GPS navigation, integrated hands-free cell phones, wireless safety communications, and automatic driving assistance systems. Advanced automatic crash notification (AACN) or automatic collision notification are vehicle telemetric systems that utilize data from crash sensors and sends crash data to an advisor indicating a vehicle is involved in an accident. Crash sensors collect the data pertaining to airbag and deployment, how quickly a vehicle decelerates (e.g., frontal collision), accelerates (e.g., side impact collision), and the onset of a vehicle rollover. Based on the collected data, the AACN, notifies the advisor (e.g., call center) through an embedded modem or mobile device connected to the vehicle, in-order to summon assistance. AACN(s) also include Good Samaritan assistance that allows drivers of vehicles that view an accident or emergency to summon assistance on the behalf of others.

As technology advances, the manner in which individuals navigate to a destination has evolved. Driverless cars, also known as a self-driving car, an automated car or an autonomous vehicle, are robotic vehicles designed to travel between destinations without a human operator. To be fully autonomous, a vehicle must be able to navigate without human intervention to a predetermined destination over roads that have not been adapted for use by the autonomous vehicle. The navigation system within a driverless vehicle calculates a route to a set destination and begins driving to the destination. As the driverless vehicle proceeds along the route, sensors monitor the environment around the driverless vehicle in addition to the movement of the driverless vehicle with respect to the environment. The artificial intelligence of the driverless vehicle simulates human perception and decision making in order to control the actions associated with the driverless vehicle.

Regardless of the type of vehicle, manned or driverless, route planning software designs an optimal route between two geographic locations (e.g., origin and destination, start point and end point, etc.) using a journey planning engine. The journey planning engine suggests one or more routes between the origin and destination that may be optimized for different criteria (e.g., fastest, shortest, least turns, toll roads, expressways, etc.) and marks the routes within an interactive map. The integration of the route planning software into global positioning systems (GPS) and portable navigation systems, allows the combination of positioning capabilities (e.g., GPS) and navigation functions, in order to monitor and control the movement of a vehicle from one location to another along the route. The navigation systems receives signals from satellites through a GPS antenna and combines the data from the satellites with the information received from onboard sensors (e.g., direction sensor, speed sensor, etc.) to identify the position and direction of the vehicle on the route. The navigation system displays the current position and direction of the vehicle on a visual output device (e.g., handheld, embedded console screen, etc.) with respect to the route, and updates the route and electronic maps real time, until reaching the destination.

SUMMARY

Aspects of the present invention disclose a method, computer program product, and system for determining navigation routes. The method includes one or more computer processors identifying an emergency situation and a corresponding location. The method further includes one or more computer processors identifying an emergency service based on the identified emergency situation and the corresponding location. The method further includes one or more computer processors identifying an emergency treatment provider based on the identified emergency situation and the corresponding location. The method further includes one or more computer processors determining a navigation route based on respective locations of the identified emergency situation, the identified emergency service, and the identified emergency treatment provider. The method further includes one or more computer processors identifying one or more incoming devices on the determined navigation route. The method further includes one or more computer processors determining an alternate navigation route for the identified one or more incoming devices, wherein the determined alternate navigation route reduces travel on the determined navigation route.

DETAILED DESCRIPTION

Traffic collisions occur when a vehicle collides with another vehicle, pedestrians, animals, road debris, or other stationary obstructions (e.g., tree, utility pole, traffic sign, guard rail, etc.). Traffic collisions include head on, road departure, rear-end, side collisions, and rollovers that may result in at a minimum injury and property damage. As recognized by embodiments of the present invention, the traffic along the route associated with a traffic collision incurs a slowdown of traffic due to traffic congestion. Traffic congestion is a condition on road networks that occurs as use increases, and is characterized by slower speeds, longer trip times, and increased vehicle queuing. For example, a traffic collision reduces the number of lanes available to incoming traffic from two lanes to one lane, in the result can be an increase in the volume of vehicles within the single lane (e.g., traffic from the two lanes merges into one lane), and slowing the flow of traffic. Embodiments of the present invention also recognize that due to the traffic congestion, the ability of emergency vehicles and emergency responders to reach the site of the traffic collisions (e.g., accident site) and or an emergency treatment provider (e.g., hospital, trauma center, etc.) are negatively impacted.

Embodiments of the present invention determine an occurrence of a traffic collision, including a location, and notify appropriate emergency services. Additionally embodiments of the present invention determine alternate routes between emergency services and the traffic collision and the traffic collision to an emergency treatment provider, by diverting incoming traffic to alternate routes to reduce traffic congestion and improve the ability of emergency services (e.g., vehicles) to reach the traffic collision and then emergency treatment providers.

Figure 1:
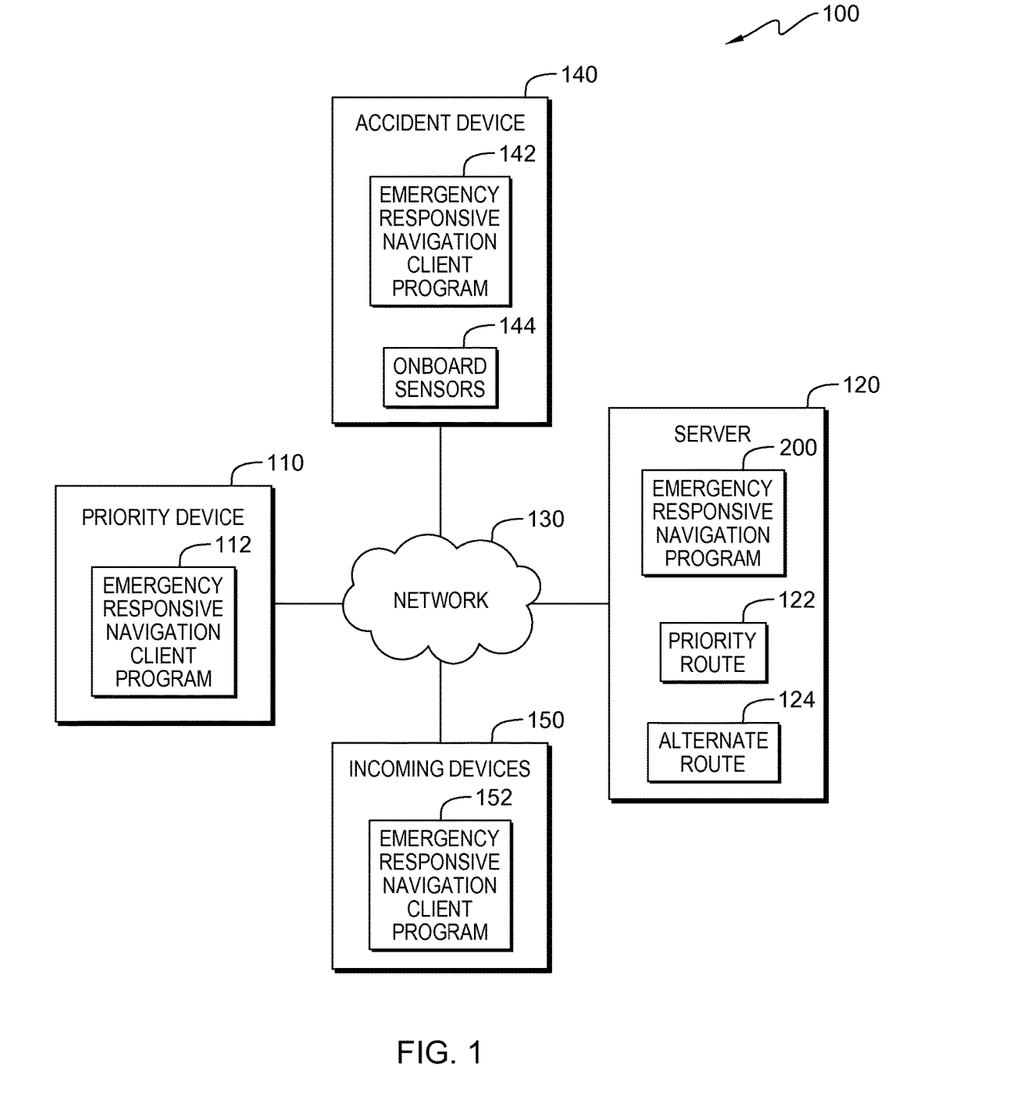
FIG. 1 is a functional block diagram illustrating an emergency notification and navigation environment, in accordance with an embodiment of the present invention.

The present invention will now be described in detail with reference to the Figures. FIG. 1 is a functional block diagram illustrating an emergency notification and navigation environment, generally designated 100, in accordance with one embodiment of the present invention. FIG. 1 provides only an illustration of one embodiment and does not imply any limitations with regard to the environments in which different embodiments may be implemented.

In the depicted embodiment, emergency notification and navigation environment 100 includes priority device 110, accident device 140, incoming devices 150, and server 120, all interconnected over network 130. Emergency notification and navigation environment 100 may include additional computing devices, mobile computing devices, servers, computers, storage devices, priority devices, accident devices, incoming devices, or other devices not shown.

Priority device 110, accident device 140, and incoming devices 150 may be electronic devices or computing systems capable of processing program instructions and receiving and sending data. In one embodiment, priority device 110, accident device 140, and incoming devices 150 are manned (e.g., include a driver) and/or unmanned (e.g., driverless car, smart car, etc.). In some embodiments, priority device 110 may be a laptop computer, a tablet computer, a netbook computer, a personal digital assistant (PDA), a smart phone, a smart vehicle, a driverless vehicle, or any programmable electronic device capable of communicating with network 130. In other embodiments, priority device 110 may represent a server computing system utilizing multiple computers as a server system, such as in a cloud computing environment. In general, priority device 110, accident device 140, and incoming devices 150 are representative of any electronic device or combination of electronic devices capable of executing machine readable program instructions as described in greater detail with regard to FIG. 3, in accordance with embodiments of the present invention. The number of priority devices, accident devices, and incoming devices are not limited to priority device 110, accident device 140, and incoming devices 150; additional priority devices, accident devices, and incoming devices may exist or be added that are not currently shown in FIG. 1.

In the depicted embodiment, priority device 110 represents an electronic device associated with (e.g., handheld on a mobile device) and/or installed within an emergency response vehicle (e.g., fire truck, ambulance, first responder). Priority device 110 contains emergency responsive navigation client program 112. In the depicted embodiment, accident device 140 represents an electronic device associated with (e.g., handheld device, mobile device, etc.) and/or installed (e.g., built-in, mobile device connected over a wireless personal area network, etc.) within a motorized vehicle (e.g., car, truck, motorcycle, driverless car, etc.) and/or non-motorized vehicle (e.g., bicycle) involved in a traffic collision. Accident device 140 contains emergency responsive navigation client program 142 and onboard sensors 144. In the depicted embodiment, incoming devices 150 represent electronic devices associated with (e.g., handheld on a mobile device) and/or installed within one or more motorized and/or non-motorized vehicles, manned or driverless, that are not physically involved in the traffic collision but are traveling on a navigation route associated with the traffic collision. Incoming devices 150 contains emergency responsive navigation client program 152. Priority device 110, accident device 140, and incoming devices 150 send and receive information through emergency responsive navigation client programs 112, 142, and 152, respectively, to emergency responsive navigation program 200.

Emergency responsive navigation client programs 112, 142, and 152 are programs designed to interact (e.g., send and receive information) with emergency responsive navigation program 200. Emergency responsive navigation client program 112 receives priority route 122 from emergency responsive navigation program 200. Emergency responsive navigation client program 142 sends emergency responsive navigation program 200 data from onboard sensors 144 regarding a traffic collision. Emergency responsive navigation client program 152 receives alternate route 124 from emergency responsive navigation program 200. In the depicted embodiment, emergency responsive navigation client programs 112, 142, and 152 reside on priority device 110, accident device 140, and incoming devices 150, respectively. In another embodiment, emergency responsive navigation client programs 112, 142, and 152 may reside on server 120 or on another device (not shown) connected over network 130 provided emergency responsive navigation client programs 112, 142, and 152 are able to access emergency responsive navigation program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with priority device 110, accident device 140, and incoming devices 150 over network 130. In other embodiments, server 120 may represent a server computing system utilizing multiple computers as a server system, such as in a cloud computing environment. Server 120 contains priority route 122, alternate route 124, and emergency responsive navigation program 200.

Priority route 122 encompasses driving directions and visual aids (e.g., maps) between the location of priority device 110, the location of a traffic collision, and an emergency treatment provider that provides the fastest driving route. For example, priority route 122 includes the driving directions for an ambulance deployed from a fire station to the site of the traffic collision, and the driving directions from the site of the traffic collision to a hospital that are optimized to reach both the traffic collision and the hospital in the minimum amount of time (e.g., fastest driving route). Priority route 122 is the output of emergency responsive navigation program 200 with respect to priority device 110 that emergency responsive navigation program 200 sends to emergency responsive navigation client program 112 for utilization. In the depicted embodiment, priority route 122 resides on server 120. In another embodiment, priority route 122 resides on priority device 110. In some other embodiments, priority route 122 resides on server or computing device (not shown) connected over network 130, provided priority route 122 is accessible by emergency responsive navigation client program 112 and emergency responsive navigation program 200.

Alternate route 124 encompasses driving directions and visual aids (e.g., maps) that alter the driving route of incoming devices 150 around the location of a traffic collision and priority route 122 to an emergency treatment provider to the next fastest route. For example, incoming devices 150 are initially traveling or will be traveling on a route on which a traffic collisions occurs. Emergency responsive navigation program 200 creates alternate route 124, which alters and/or diverts incoming devices 150 off of priority route 122 to the next fastest route that reaches the original destination associated with each instance of incoming devices 150 that does not include the roads associated with priority route 122 (e.g., changes to the secondary set of driving directions associated with the second fastest route). Alternate route 124 is the output of emergency responsive navigation program 200 with respect to incoming devices 150 that emergency responsive navigation program 200 sends to emergency responsive navigation client program 152 for utilization. The number of alternate routes are not limited to alternate route 124; additional versions of alternate route 124 may exist or be added that are not currently shown in FIG. 1. In the depicted embodiment, alternate route 124 resides on server 120. In another embodiment, alternate route 124 resides on incoming devices 150. In some other embodiment, alternate route 124 resides on server or computing device (not shown) connected over network 130, provided alternate route 124 is accessible by emergency responsive navigation client program 152 and emergency responsive navigation program 200.

Network 130 may be a local area network (LAN), a wide area network (WAN) such as the Internet, a wireless local area network (WLAN), any combination thereof, or any combination of connections and protocols that will support communications between priority device 110, accident device 140, incoming devices 150, server 120, and other computing devices and servers (not shown), in accordance with embodiments of the inventions. Network 130 may include wired, wireless, or fiber optic connections.

Onboard sensors 144 represent sensors that detect conditions associated with accident device 140 that are indicative of a traffic collision. In one embodiment, onboard sensors 144 represent crash sensors associated with an advanced automatic crash notification (AACN) or automatic collision notification that determines a vehicle is involved in an accident such as airbag deployment, vehicle deceleration, vehicle accelerations, and vehicle rollovers. In another embodiment, onboard sensors 144 represent accelerometers and gyroscopes associated with a handheld device (e.g., mobile phone) that provide information for analysis resulting in the determination of a traffic collision. For example, a bicycle rider carries a mobile device when traveling. The accelerometer associated with the mobile device notes a rapid deceleration in conjunction with repeated gyroscopic rollovers and determines the potential occurrence of a traffic collision.

Emergency responsive navigation program 200 is a program for detecting a traffic collision and determining priority route 122 and alternate route 124. Emergency responsive navigation program 200 receives information from onboard sensors 144 that are indicative of a traffic collision as well as a corresponding location. Emergency responsive navigation program 200 determines priority route 122 between the location of priority device 110, the location of accident device 140, and the location on the emergency treatment provider (e.g., hospital). In addition, emergency responsive navigation program 200 identifies incoming devices 150 that intersect with priority route 122 and determines alternate route 124 to divert traffic associated with incoming devices 150 to a secondary route that does not include the portions of priority route 122 that would negatively impact the time taken by priority device 110 to reach accident device 140 and the emergency treatment provider. Emergency responsive navigation program 200 sends and receives information from emergency responsive navigation client programs 112, 142, and 152. In the depicted embodiment, emergency responsive navigation program 200 resides on server 120. In another embodiment, emergency responsive navigation program 200 resides on priority device 110, accident device 140, and/or incoming devices 150. In some other embodiment, emergency responsive navigation program 200 resides on server or computing device (not shown) connected over network 130, provided emergency responsive navigation program 200 is accessible to and by emergency responsive navigation client programs 112, 142, and 152, onboard sensors 144, priority route 122, and alternate route 124.

Figure 2:
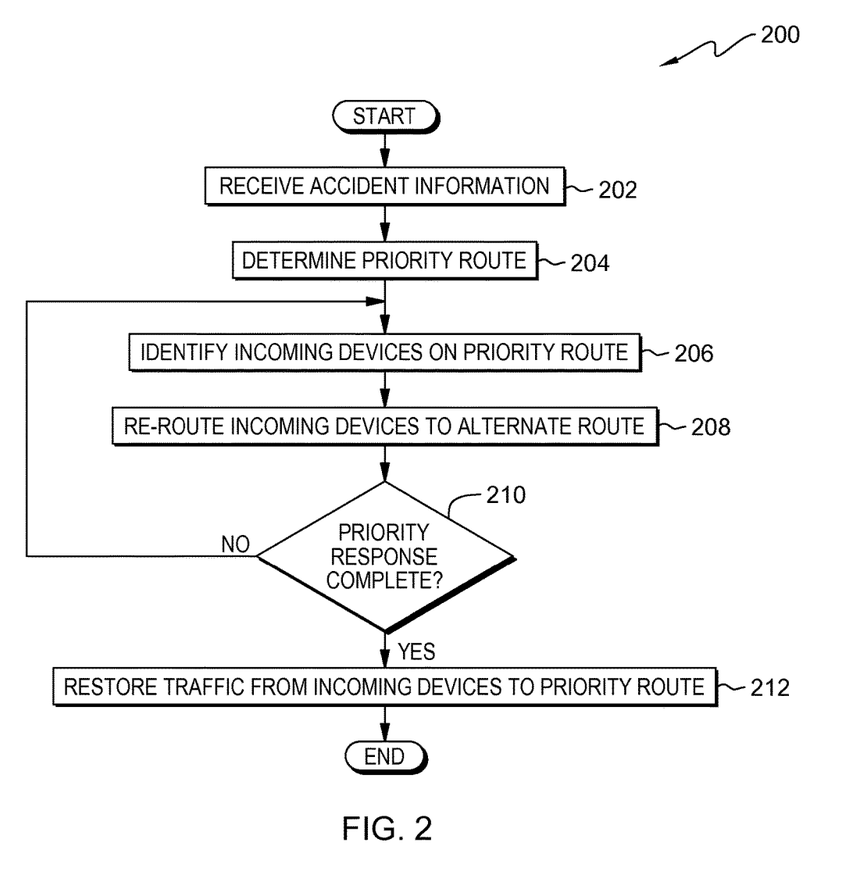
FIG. 2 is a flowchart depicting operational steps of an emergency responsive navigation program, on a server computer within the emergency notification and navigation environment of FIG. 1, for detecting a traffic collision and providing alternate navigation routes to incoming traffic around the traffic collision, in accordance with an embodiment of the present invention.

FIG. 2 is a flowchart depicting operational steps of emergency responsive navigation program 200, a program for detecting a traffic collision and providing priority route 122 and alternate route 124 to incoming traffic around the traffic collision, in accordance with an embodiment of the present invention. In an alternate embodiment, emergency responsive navigation program 200 is a program for detecting an emergency situation (e.g., fire, natural disasters, civil emergency, states of emergency, etc.) and providing priority route 122 and alternate route 124 to incoming traffic around the emergency situation, in accordance with an embodiment of the present invention.

In step 202, emergency responsive navigation program 200 receives accident information and initiates. Accident information includes data pertaining to at least a location and may also include accident specifications such as a type of accident (e.g., traffic collision, fire, natural disaster, etc.), severity, number of vehicles involved, etc. In one embodiment, emergency responsive navigation program 200 receives information from onboard sensors 144 through emergency responsive navigation client program 142 and initiates. For example, accident device 140 is involved in single car collision in which the air bags deploy as noted by onboard sensors 144. Emergency responsive navigation program 200 receives the data from onboard sensors 144 as well as a location through a GPS service associated with accident device 140. In another embodiment, emergency responsive navigation program 200 receives accident information from more than one set of onboard sensors 144 (e.g., multi-car accident) and initiates.

In some other embodiment, emergency responsive navigation program 200 receives information after a user of accident device 140 does not respond to prompts from emergency responsive navigation client program 142. For example, an individual riding a bicycle carries a smartphone. Onboard sensors 144 within the smartphone note a rapid deceleration accompanied by changes in the internal gyroscope. Emergency responsive navigation client program 142 prompts the user for a response, such as "Are emergency services needed?". Emergency responsive navigation client program 142 sends information to emergency responsive navigation program 200 in response to a positive indication that assistance is needed and/or no response indicated and no change to the location of the smartphone within a specified period of time (e.g., five minutes, ten minutes, etc.) and emergency responsive navigation program 200 initiates.

In another embodiment, emergency responsive navigation program 200 receives information from incoming devices 150 that identifies an accident through emergency responsive navigation client program 152 (e.g., incoming device is proximate to the accident). For example, a driver of another vehicle witnesses a traffic collision and dials "911" or another service to report the accident. Emergency responsive navigation program 200 receives the accident information from emergency responsive navigation client program 152 and/or another emergency service via network 130 in response to a request for emergency services and initiates.

In an alternate embodiment, emergency responsive navigation program 200 receives notification of an emergency situation through a private and/or public notification system. For example, the private alarm system associated with a business and/or house connects to a local fire department. Onboard sensors 144 are installed within the business and/or house as part of the private alarm system and when triggered, notify the fire department and emergency responsive navigation program 200 of a potential fire and injuries to individuals in an occupied building. In another example, a public notification system, such as an emergency broadcast system, notifies individuals and emergency responsive navigation program 200 of road closures due to a water main break. Upon receipt of the accident information, emergency responsive navigation program 200 initiates.

In step 204, emergency responsive navigation program 200 determines priority route 122 between priority device 110, accident device 140, and emergency treatment providers. Emergency responsive navigation program 200 accesses a navigation database that includes the roads and location of emergency services (e.g., police stations, ambulances, fire stations, etc.) and emergency treatment providers (e.g., hospitals, clinics, trauma centers, etc.). Emergency responsive navigation program 200 locates the emergency services (e.g., priority device 110) that are closest to accident device 140. In one embodiment, emergency responsive navigation program 200 selects priority device 110 associated with a dispatch center (e.g., location that houses ambulances, fire trucks, etc.) in which emergency responsive navigation program 200 determines an instance of priority device 110 that is closest by distance and/or travel time to accident device 140. In another embodiment, emergency responsive navigation program 200 selects priority device 110 based on a moving location (e.g., ambulance is in route to a dispatch center, ambulance is traveling within a service area, etc.) in which emergency responsive navigation program 200 determines an instance of priority device 110 that is closest by distance and/or travel time to accident device 140.

In some embodiments, emergency responsive navigation program 200 selects more than one instance of priority device 110 with respect to accident device 140. For example, emergency responsive navigation program 200 determines a traffic collision occurs that includes a minimum of ten vehicles. As the occupancy of a single ambulance is limited to two boarded patients, and the number of injured individuals is unknown, emergency responsive navigation program 200 deploys multiple instances of priority device 110.

In one embodiment, emergency responsive navigation program 200 locates the emergency treatment providers that are closest to accident device 140 by travel time and/or distance. Emergency responsive navigation program 200 identifies the emergency treatment providers within the navigation database. Emergency responsive navigation program 200 determines the routes between the location of accident device 140 and the emergency treatment providers and calculates distances and estimated time of arrival (e.g., travel time). Emergency responsive navigation program 200 selects the emergency treatment provider based on the fastest estimated time of arrival.

In another embodiment, emergency responsive navigation program 200 locates the emergency treatment providers based on the severity of the traffic collision. In one embodiment, emergency responsive navigation program 200 determines the severity of the accident based on information from onboard sensors 144. For example, crash sensors associated with airbag deployment deploy based on a transient impact of 5 to 7 g at a crash speed between 5 to 15 mph. Emergency responsive navigation program 200 compares the speeds and gravitational forces recorded through onboard sensors 144 and assigns a severity by comparing the recorded speeds and gravitational forces with known speeds and gravitational forces associated with accident severity. In another embodiment, emergency responsive navigation program 200 determines the severity based on responses from an occupant associated with accident device 140 through emergency responsive navigation client program 142. For example, a traffic collision in which the driver of accident device 140 is responsive (e.g., verbalizes responses, initiates a request for assistance) emergency responsive navigation program 200 selects a local hospital as the severity of the accident is not severe. However, in a similar instance, the driver of accident device 140 is unresponsive (e.g., unable to communicate, accident device 140 initiates a request for assistance) and emergency responsive navigation program 200 selects an advanced trauma center.

Upon selection of priority device 110, emergency responsive navigation program 200 determines priority route 122 for priority device 110 to reach accident device 140. Additionally, emergency responsive navigation program 200 determines priority route 122 from accident device 140 to the emergency treatment provider. Emergency responsive navigation program 200 combines the multiple destination route into a single instance of priority route 122. For example, a traffic collision occurs on a highway a mile from an entrance ramp from a town with an ambulance. Emergency responsive navigation program 200 receives the location of accident device 140 through GPS coordinates. Emergency responsive navigation program 200 selects the local ambulance from the town as priority device 110. Emergency responsive navigation program 200 locates the nearest hospital fifteen miles away. Emergency responsive navigation program 200 identifies the address of the dispatch center associated with the ambulance and maps the first portion of priority route 122 from the dispatch center to the traffic collision (e.g., location of accident device 140). Emergency responsive navigation program 200 identifies the address of the hospital and maps the second portion of priority route 122 from the traffic collision (e.g., location of accident device 140) to the hospital. Emergency responsive navigation program 200 sends priority route 122 to emergency responsive navigation client program 112 for use.

In some embodiments, emergency responsive navigation program 200 modifies priority route 122 after reaching the location of accident device 140 based on assessments made by emergency personnel. Emergency responsive navigation program 200 receives an update (e.g., change of accident severity, selection of a specific hospital, etc.) from emergency personnel through emergency responsive navigation client program 112. For example, at the location of accident device 140, the driver is responsive and requests to go to a specific hospital associated with a doctor whom the driver is a patient. Based on the driver request (e.g., preference), emergency responsive navigation program 200 receives the new hospital from emergency personnel and updates the second half of priority route 122. In another example, at the location of accident device 140, an occupant incurs a heart attack and the user of priority device 110 selects a cardiac care hospital within the vicinity. Based on the emergency personnel input, emergency responsive navigation program 200 receives the cardiac care hospital as the new final destination and updates the second half of priority route 122. Emergency responsive navigation program 200 sends the update to priority route 122 to emergency responsive navigation client program 112 for use.

In step 206, emergency responsive navigation program 200 identifies incoming devices 150 on priority route 122. Emergency responsive navigation program 200 identifies GPS signals from GPS-enabled devices (e.g., mobile devices, vehicles with installed GPS navigation systems, handheld GPS devices, etc.) associated with incoming devices 150 that travel on, intersect, and/or merge with priority route 122. Emergency responsive navigation program 200 compares the identified GPS coordinates (e.g., received from GPS-enabled devices) with the GPS coordinates associated with priority route 122 (e.g., navigation software). Emergency responsive navigation program 200 identifies incoming devices 150 when matches between the identified GPS coordinates from GPS-enabled devices and the GPS coordinates associated with priority route 122 occur. Additionally, emergency responsive navigation program 200 identifies incoming devices 150 that include GPS coordinates that are moving towards priority route 122 on roads that merge and/or intersect.

For example, a traffic collision occurs on Main Street which connects to Front Street which includes the selected hospital for treatment. Emergency responsive navigation program 200 identifies vehicles that are currently traveling on Main Street with a GPS location prior to the site of the traffic collision as incoming devices 150. Emergency responsive navigation program 200 identifies vehicles traveling after the site of the traffic collision on Main Street and Front Street between the traffic collision and the hospital as incoming devices 150. Additionally, Green Street intersects Front Street prior to the hospital, and emergency responsive navigation program 200 identifies additional instances of incoming devices 150 that include GPS coordinates moving towards Front Street. However, emergency responsive navigation program 200 does not include vehicles traveling away from the traffic collision on Green Street within incoming devices 150, as the vehicles are moving away from the site of the traffic collision.

In another embodiment, emergency responsive navigation program 200 identifies incoming devices 150 based on planned navigation routes (e.g., vehicles currently utilizing GPS navigation to reach a destination). Emergency responsive navigation program 200 queries emergency responsive navigation client program 152 to identify whether the current navigation route associated with potential instances of incoming devices 150 include, intersect, and/or merge with priority route 122 when traveling to a destination. For example, a vehicle is traveling a planned navigation route from a residence on North Street to a museum on Front Street. The vehicle is currently on North Street, but the navigation route indicates a left turn onto Green Street, which intersects with Front Street, and a right turn onto Front Street in order to reach the destination of the museum after passing by the hospital. Emergency responsive navigation program 200 receives an indication from emergency responsive navigation client program 152 that the planned route of the vehicle includes portions of priority route 122. Therefore, emergency responsive navigation program 200 includes the vehicle within incoming devices 150.

Emergency responsive navigation program 200 continues to identify incoming devices 150 until a priority response is complete. A priority response encompasses the actions and travel time associated with an emergency service responding to an emergency situation and completes upon reaching an emergency treatment provider. For example, a priority response initiates at the time an accident, traffic collision, emergency situation occurs and notifies an emergency service. Additionally, the travel time to reach the accident, time spent at the accident site, and the travel time to reach an emergency treatment provider are also included as part of the priority response. Emergency responsive navigation program 200 removes vehicles from incoming devices 150 after incoming devices 150 divert to alternate route 124 and/or reach a destination as incoming devices 150 are no longer associated with priority route 122.

In step 208, emergency responsive navigation program 200 re-routes incoming devices 150 to alternate route 124. Emergency responsive navigation program 200 notifies incoming devices 150 of a traffic collision and changes from current navigation routes to alternate route 124. In one embodiment, emergency responsive navigation program 200 sends an audio and/or a text message for display on incoming devices 150 with information regarding the traffic collision, including a location, and an update in navigation to alternate route 124. In another embodiment, emergency responsive navigation program 200 sends a message to highway billboard signs indicating the location of the traffic collision and may include instructions to divert incoming devices 150 around priority route 122 to alternate route 124. For example, a vehicle may not be equipped with a navigation system and or/mobile device; however, the driver views highway road signs and/or tunes a radio to a highway traffic advisory channel and diverts to alternate route 124 by following the highway signs and or audio instructions via the radio.

Emergency responsive navigation program 200 plans alternate route 124 to no longer include priority route 122 and/or at least portions of priority route 122. In one embodiment, emergency responsive navigation program 200 identifies potential navigation routes between the location of incoming devices 150 and identified destinations (e.g., traveling on a planned navigation route). Emergency responsive navigation program 200 discards potential navigations routes that include priority route 122 and/or portions of priority route 122. From the remaining potential navigation routes, emergency responsive navigation program 200 identifies the fastest of the remaining potential navigation routes as alternate route 124. Emergency responsive navigation program 200 sends alternate route 124 to emergency responsive navigation client program 152, thus updating the navigation route to avoid priority route 122.

In another embodiment, emergency responsive navigation program 200 identifies alternate route 124 as the fastest route from the location of incoming devices around priority route 122 (e.g., destination is not known). For example, a vehicle enters a highway at exit 1, and the location of accident device 140 is between exit two and exit three. In this example, priority route 122 enters the highway at exit 2, leaves the highway at exit 3, and continues to a hospital. Emergency responsive navigation program 200 creates and sends alternate route 124 to emergency responsive navigation client program 152, which instructs the manned or driverless car to exit the highway at exit two and take the secondary road to the entrance ramp at exit 3 to rejoin the highway. In one embodiment, incoming devices 150 are driverless, and alternate route 124 immediately replaces current navigation routes via emergency responsive navigation client program 152. In another embodiment, incoming devices 150 are manned and prior to replacing current navigation routes with alternate route 124, the user, through emergency responsive navigation client program 152, accepts alternate route 124, which then replaces existing navigation routes.

In decision 210, emergency responsive navigation program 200 determines whether a priority response is complete. In one embodiment, emergency responsive navigation program 200 receives updates to the location of priority device 110 that corresponds with priority route 122, and emergency responsive navigation program 200 determines the priority response is in-progress. In another embodiment, emergency responsive navigation program 200 receives an indication from priority device 110 via emergency responsive navigation client program 112 indicating priority device 110 is no longer at the location of accident device 140 and is in route to the emergency treatment provider (i.e., priority response is not complete). In another embodiment, emergency responsive navigation program 200 receives an indication from priority device 110 via emergency responsive navigation client program 112 indicating priority device 110 arrives at the emergency treatment provider (i.e., priority response it complete).

If emergency responsive navigation program 200 determines that the priority response is complete (decision 210, yes branch), then emergency responsive navigation program 200 restores traffic from incoming devices 150 to priority route 122 (step 212). If emergency responsive navigation program 200 determines that the priority response is not complete (decision 210, no branch), then emergency responsive navigation program 200 identifies incoming devices 150 on priority route 122 (step 206).

In step 212, emergency responsive navigation program 200 restores the flow of traffic from incoming devices 150 to priority route 122. In one embodiment, emergency responsive navigation program 200 restores the flow of traffic incrementally to priority route 122. For example, priority device 110 leaves the location of accident device 140 and is in route to the hospital. Emergency responsive navigation program 200 restores traffic to the portions of priority route 122 that are behind priority device 110. In another embodiment, emergency responsive navigation program 200 restores the flow of traffic when the priority response is complete (e.g., priority device 110 arrives at the emergency treatment provider).

Emergency responsive navigation program 200 removes restrictions associated with priority route 122. In one embodiment, emergency responsive navigation program 200 recalculates the navigation routes associated with incoming devices 150. Emergency responsive navigation program 200 selects the fastest route to the destination, which again allows selection of priority route 122 and/or utilization of portions of priority route 122 within the navigation routes. Emergency responsive navigation program 200 sends the updated navigation routes to emergency responsive navigation client program 152 for utilization. In another embodiment, emergency responsive navigation program 200 removes and/or cancels messages to highway billboard signs and/or emergency notification systems. Emergency responsive navigation program 200 completes upon restoring the flow of traffic to include priority route 122.

Figure 3:
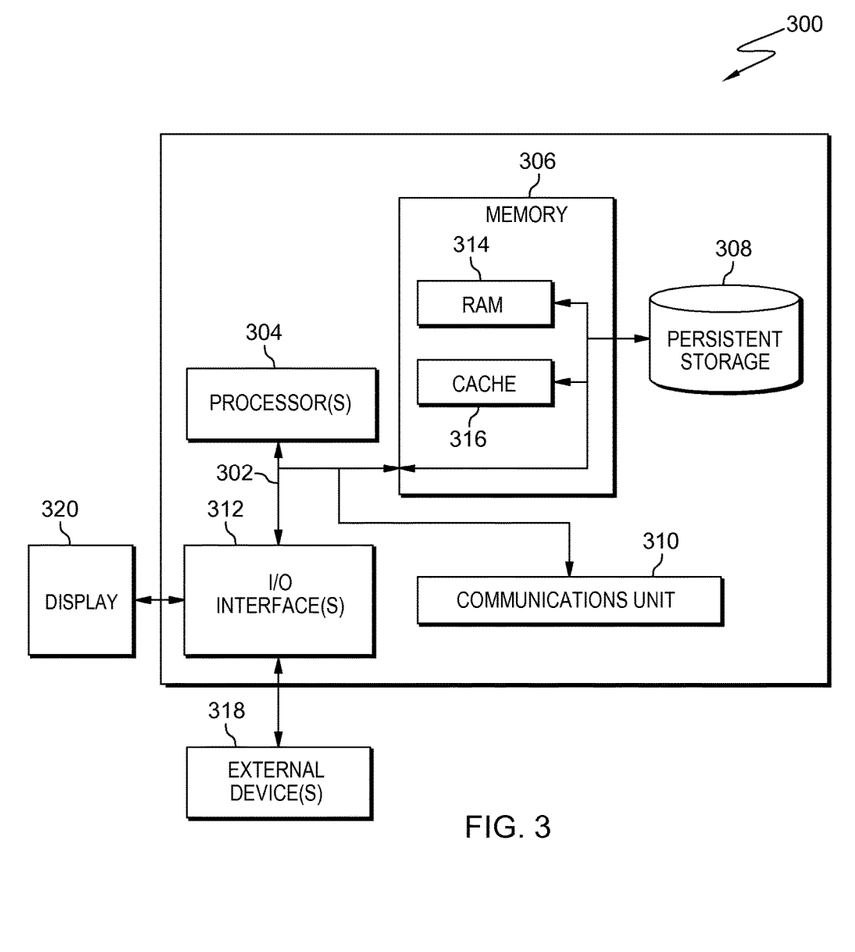
FIG. 3 is a block diagram of components of the server computer executing the emergency responsive navigation program, in accordance with an embodiment of the present invention.

FIG. 3 depicts a block diagram of components of server computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

Emergency responsive navigation client programs 112, 142, and 152, onboard sensors 144, priority route 122, alternate route 124, and emergency responsive navigation program 200 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Emergency responsive navigation client programs 112, 142, and 152, onboard sensors 144, priority route 122, alternate route 124, and emergency responsive navigation program 200 may be downloaded to persistent storage 308 through communications unit 310.

I/O interface(s) 312 allows for input and output of data with other devices that may be connected to server computer 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., emergency responsive navigation client programs 112, 142, and 152, onboard sensors 144, priority route 122, alternate route 124, and emergency responsive navigation program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining navigation routes, the method comprising:
    identifying, by a computer server, an emergency situation, a severity, a number of vehicles associated with the emergency situation, and a corresponding location;
    identifying, by the computer server, an emergency services based on the identified emergency situation, the severity, and the corresponding location;
    determining, by the computer server, a number of emergency response vehicles to provide based on the identified emergency services, the number of vehicles associated with the emergency situation and an occupancy limit of an emergency response vehicle;
    determining, by the computer server, a location of each of the one or more emergency response vehicles to match the determined number of emergency response vehicles to provide with respect to the corresponding location, wherein the location of each of the one or more emergency response vehicles includes a moving location of an emergency response vehicle and a fixed location associated with the identified emergency services;
    identifying, by the computer server, an emergency treatment provider automatically based on the identified emergency situation, the severity, and the corresponding location;
    determining, by the computer server, a navigation route based on respective locations of the identified emergency situation, each of the one or more emergency response vehicles, and the identified emergency treatment provider, wherein the navigation route are optimized directions from the location of each of the one or more emergency response vehicles to a location of the identified emergency situation and from the location of the identified emergency situation to a location of the identified emergency treatment provider;
    identifying, by the computer server, one or more incoming devices on the determined navigation route based on one or more global positioning signals from the one or more incoming devices that move toward the identified emergency situation, wherein the one or more incoming devices are excluded from the emergency response vehicles;
    determining, by the computer server, an alternate navigation route for the identified one or more incoming devices, wherein the determined alternate navigation route diverts the one or more incoming vehicles from the determined navigation route to a secondary route that maintains a destination associated with each of the one or more incoming vehicles; and
    rerouting, by one or more computer processors, the identified one or more incoming devices to the determined alternate navigation route.

2. The method of claim 1, wherein identifying the emergency situation, the severity, the number of emergency response vehicles associated with the emergency situation, and the corresponding location further comprises:
    receiving, by the computer server, information from sensors of a computing device involved in the identified emergency situation, wherein the information from the sensors include data associated with the location, speed, gravitational forces, acceleration, deceleration, rollover, and fire;
    determining, by the computer server, the severity based on a comparison of the received information from the sensors of the computing device involved in the identified emergency situation with an accident severity information; and
    identifying, by the computer server the emergency situation based on the received information from the sensors of the computing device involved in the identified emergency situation and the determined severity.

3. The method of claim 1, wherein identifying the emergency service based on the identified emergency situation further comprises:
    determining, by the computer server, one or more emergency services and corresponding respective locations within a navigation database based on the corresponding location of the identified emergency situation and the moving location of the emergency response vehicle;
    determining, by the computer server, one or more navigation routes that connect the corresponding location of the identified emergency situation and a location of an emergency service of the identified one or more emergency services;
    determining, by the computer server, a travel time associated with the one or more determined navigation routes; and
    selecting, by the computer server, the emergency response vehicles from the one or more emergency services based on a fastest determined travel time associated with the determined one or more navigation routes.

4. The method of claim 1, wherein identifying the emergency treatment provider based on the identified emergency situation, the severity, and the corresponding location further comprises:
    determining, by the computer server, one or more emergency treatment providers and corresponding respective locations within a navigation database based on the corresponding location of the identified emergency situation and the severity;
    determining, by the computer server, one or more navigation routes that connect the corresponding location of the identified emergency situation and a location of an emergency treatment provider of the identified one or more emergency treatment providers,
    determining, by the computer server, a travel time associated with the one or more determined navigation routes; and
    selecting, by the computer server, the identified emergency treatment provider from the one or more emergency treatment providers based on a preference from an individual associated with the identified emergency situation.

5. The method of claim 1, wherein identifying the one or more incoming devices on the determined navigation route further comprises:
   identifying, by the computer server, one or more incoming devices on the determined navigation route;
   identifying, by the computer server, one or more incoming devices intersecting with the determined navigation route; and
   identifying, by the computer server, one or more incoming devices merging with the determined navigation route.

6. The method of claim 1, wherein determining an alternate navigation route for the identified incoming devices further comprises;
   determining, by the computer server, one or more navigation routes associated with the one or more incoming devices that maintain the destination associated with each of the one or more incoming vehicles;
   identifying, by the computer server, one or more of the determined navigation routes that do not include at least a portion of the determined navigation route associated with the emergency situation;
   selecting, by the computer server, a fastest navigation route from the identified one or more determined navigations routes that do not include at least a portion of the determined navigation route associated with the emergency situation; and
   sending, by the computer server, the selected fasted navigation route to the identified one or more incoming devices.

7. The method of claim 1, further comprising;
   determining, by the computer server, that the emergency situation is complete; and
   restoring, by the computer server, the one or more incoming devices to the determined navigation route.

8. The method of claim 1, wherein identifying the emergency situation, the corresponding location, and the severity further comprises:
   receiving, by the computer server, a notification from a notification system, wherein the notification system includes the corresponding location and one or more of private alarms and public address systems that include sensors; and
   receiving, by the computer server, information from the sensors of the notification system, wherein the information from the sensors includes data associated with the location, a type of emergency and a number of individuals associated with the identified emergency situation;
   determining, by the computer server, a severity based on the type of emergency and the number of individuals associated with the identified emergency situation; and
   identifying, by the computer server, the emergency situation based on the received information from the sensors of the notification system involved in the identified emergency situation.

9. A computer program product for determining navigation routes, the computer program product comprising:
   one or more computer readable storage media and program instructions stored on the one or more computer readable storage media, the program instructions comprising:
   program instructions to identify an emergency situation, a severity, a number of vehicles associated with the emergency situation, and a corresponding location;
   program instructions to identify an emergency services based on the identified emergency situation, the severity, and the corresponding location;
   program instructions to determine a number of emergency response vehicles to provide based on the identified emergency services, the number of vehicles associated with the emergency situation and an occupancy limit of the identified emergency response vehicle;
   program instructions to determine a location of each of the one or more emergency response vehicles to match the determined number of emergency response vehicles to provide with respect to the corresponding location, wherein the location of each of the one or more emergency response vehicles includes a moving location of an emergency response vehicle and a fixed location associated with the identified emergency services;
   program instructions to identify an emergency treatment provider automatically based on the identified emergency situation, the severity, and the corresponding location;
   program instructions to determine a navigation route based on respective locations of the identified emergency situation, each of the one or more emergency response vehicles, and the identified emergency treatment provider, wherein the navigation route are optimized directions from the location of each of the one or more emergency response vehicles to a location of the identified emergency situation and from the location of the identified emergency situation to a location of the identified emergency treatment provider;
   program instructions to identify one or more incoming devices on the determined navigation route based on one or more global positioning signals from the one or more incoming devices that move toward the identified emergency situation, wherein the one or more incoming devices are excluded from the emergency response vehicles;
   program instructions to determine an alternate navigation route for the identified one or more incoming devices, wherein the determined alternate navigation route diverts the one or more incoming vehicles from the determined navigation route to a secondary route that maintains a destination associated with each of the one or more incoming vehicles; and
   program instructions to reroute the identified one or more incoming devices to the determined alternate navigation route.

10. The computer program product of claim 9, wherein to identify the emergency situation, the severity, the number of emergency response vehicles associated with the emergency situation, and the corresponding location further comprises program instructions, stored on the one or more computer readable storage media, to:
    receive information from sensors of a computing device involved in the identified emergency situation, wherein the information from the sensors include data associated with the location, speed, gravitational forces, acceleration, deceleration, rollover, and fire;
    determine the severity based on a comparison of the received information from the sensors of the computing device involved in the identified emergency situation with an accident severity information; and
    identify the emergency situation based on the received information from the sensors of the computing device involved in the identified emergency situation and the determined severity.

11. The computer program product of claim 9, wherein to identify the emergency service based on the identified emergency situation further comprises program instructions, stored on the one or more computer readable storage media, to:
- determine the one or more emergency services and corresponding respective locations within a navigation database based on the corresponding location of the identified emergency situation and the moving location of the emergency response vehicle;
- determine one or more navigation routes that connect the corresponding location of the identified emergency situation and a location of an emergency service of the identified one or more emergency services;
- determine a travel time associated with the one or more determined navigation routes; and
- select the emergency response vehicles from the one or more emergency services based on a fastest determined travel time associated with the determined one or more navigation routes.

12. The computer program product of claim 9, wherein to identify the emergency treatment provider based on the identified emergency situation, the severity, and the corresponding location further comprises program instructions, stored on the one or more computer readable storage media, to:
- determine one or more emergency treatment providers and corresponding respective locations within a navigation database based on the corresponding location of the identified emergency situation and the severity;
- determine one or more navigation routes that connect the corresponding location of the identified emergency situation and a location of an emergency treatment provider of the identified one or more emergency treatment providers,
- determine a travel time associated with the one or more determined navigation routes; and
- select the identified emergency treatment provider from the one or more emergency treatment providers based on a preference from an individual associated with the identified emergency situation.

13. The computer program product of claim 9, wherein to identify the one or more incoming devices on the determined navigation route further comprises program instructions, stored on the one or more computer readable storage media, to:
- identify one or more incoming devices on the determined navigation route;
- identify one or more incoming devices intersecting with the determined navigation route; and
- identify one or more incoming devices merging with the determined navigation route.

14. The computer program product of claim 9, wherein to determine an alternate navigation route for the identified incoming devices further comprises program instructions, stored on the one or more computer readable storage media, to:
- determine one or more navigation routes associated with the one or more incoming devices that maintain the destination associated with each of the one or more incoming vehicles;
- identify one or more of the determined navigation routes that do not include at least a portion of the determined navigation route associated with the emergency situation;
- select a fastest navigation route from the identified one or more determined navigations routes that do not include at least a portion of the determined navigation route associated with the emergency situation; and
- send the selected fasted navigation route to the identified one or more incoming devices.

15. A computer system for determining navigation routes, the computer system comprising:
- one or more computer processors, one or more computer readable storage media, and program instructions stored on the computer readable storage media for execution by at least one of the one or more processors, the program instructions comprising:
- program instructions to identify an emergency situation, a severity, a number of vehicles associated with the emergency situation, and a corresponding location;
- program instructions to identify an emergency services based on the identified emergency situation, the severity, and the corresponding location;
- program instructions to determine a number of emergency response vehicles to provide based on the identified emergency services, the number of vehicles associated with the emergency situation and an occupancy limit of the identified emergency response vehicle;
  - program instructions to determine a location of each of the one or more emergency response vehicles to match the determined number of emergency response vehicles to provide with respect to the corresponding location, wherein the location of each of the one or more emergency response vehicles includes a moving location of an emergency response vehicle and a fixed location associated with the identified emergency services;
- program instructions to identify an emergency treatment provider automatically based on the identified emergency situation, the severity, and the corresponding location;
- program instructions to determine a navigation route based on respective locations of the identified emergency situation, each of the one or more emergency response vehicles, and the identified emergency treatment provider, wherein the navigation route are optimized directions from the location of each of the one or more emergency response vehicles to a location of the identified emergency situation and from the location of the identified emergency situation to a location of the identified emergency treatment provider;
- program instructions to identify one or more incoming devices on the determined navigation route based on one or more global positioning signals from the one or more incoming devices that move toward the identified emergency situation, wherein the one or more incoming devices are excluded from the emergency response vehicles;
- program instructions to determine an alternate navigation route for the identified one or more incoming devices, wherein the determined alternate navigation route diverts the one or more incoming vehicles from the determined navigation route to a secondary route that maintains a destination associated with each of the one or more incoming vehicles; and
- program instructions to reroute the identified one or more incoming devices to the determined alternate navigation route.

16. The computer system of claim 15, wherein to identify the emergency situation, the severity, the number of emergency response vehicles associated with the emergency situation, and the corresponding location further comprises program instructions, stored on the one or more computer readable storage media, to:

receive information from sensors of a computing device involved in the identified emergency situation, wherein the information from the sensors include data associated with the location, speed, gravitational forces, acceleration, deceleration, rollover, and fire;

determine the severity based on a comparison of the received information from the sensors of the computing device involved in the identified emergency situation with an accident severity information; and     identify the emergency situation based on the received information from the sensors of the computing device involved in the identified emergency situation and the determined severity.

17. The computer system of claim 15, wherein to identify the emergency service based on the identified emergency situation further comprises program instructions, stored on the one or more computer readable storage media, to:

determine the one or more emergency services and corresponding respective locations within a navigation database based on the corresponding location of the identified emergency situation and the moving location of the emergency response vehicle;

determine one or more navigation routes that connect the corresponding location of the identified emergency situation and a location of an emergency service of the identified one or more emergency services;

determine a travel time associated with the one or more determined navigation routes; and     select the emergency response vehicles from the one or more emergency services based on a fastest determined travel time associated with the determined one or more navigation routes.

18. The computer system of claim 15, wherein to identify the emergency treatment provider based on the identified emergency situation, the severity, and the corresponding location further comprises program instructions, stored on the one or more computer readable storage media, to:

determine one or more emergency treatment providers and corresponding respective locations within a navigation database based on the corresponding location of the identified emergency situation and the severity;

determine one or more navigation routes that connect the corresponding location of the identified emergency situation and a location of an emergency treatment provider of the identified one or more emergency treatment providers,     determine a travel time associated with the one or more determined navigation routes; and     select the identified emergency treatment provider from the one or more emergency treatment providers based on a preference from an individual associated with the identified emergency situation.

19. The computer system of claim 15, wherein to identify the one or more incoming devices on the determined navigation route further comprises program instructions, stored on the one or more computer readable storage media, to:

identify one or more incoming devices on the determined navigation route;

identify one or more incoming devices intersecting with the determined navigation route; and     identify one or more incoming devices merging with the determined navigation route.

20. The computer system of claim 15, wherein to determine an alternate navigation route for the identified incoming devices further comprises program instructions, stored on the one or more computer readable storage media, to:

determine one or more navigation routes associated with the one or more incoming devices that maintain the destination associated with each of the one or more incoming vehicles;

identify one or more of the determined navigation routes that do not include at least a portion of the determined navigation route associated with the emergency situation;

select a fastest navigation route from the identified one or more determined navigations routes that do not include at least a portion of the determined navigation route associated with the emergency situation; and     send the selected fasted navigation route to the identified one or more incoming devices.

\* \* \* \* \*